(12) United States Patent
Yoon et al.

(10) Patent No.: US 10,361,615 B2
(45) Date of Patent: Jul. 23, 2019

(54) ELECTRIC MOTOR AND COMPRESSOR HAVING THE SAME

(71) Applicant: Samsung Electronics Co., Ltd., Suwon-si, Gyeonggi-do (KR)

(72) Inventors: Tae-ho Yoon, Suwon-si (KR); Byoung-soo Ko, Seoul (KR); Hong-seok Kim, Yongin-si (KR); Hyung-chul Lee, Gunpo-si (KR); Young-kwan Kim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 323 days.

(21) Appl. No.: 15/288,277

(22) Filed: Oct. 7, 2016

(65) Prior Publication Data

US 2017/0104399 A1 Apr. 13, 2017

(30) Foreign Application Priority Data

Oct. 8, 2015 (KR) ........................ 10-2015-0141366

(51) Int. Cl.

| | |
|---|---|
| H02K 1/14 | (2006.01) |
| H02K 1/27 | (2006.01) |
| H02K 3/18 | (2006.01) |
| H02K 7/14 | (2006.01) |
| F04C 18/34 | (2006.01) |

(Continued)

(52) U.S. Cl.
CPC ............ H02K 21/14 (2013.01); F04C 18/34 (2013.01); F04C 23/003 (2013.01); F04C 29/02 (2013.01); H02K 1/146 (2013.01); H02K 1/2706 (2013.01); H02K 3/18 (2013.01); H02K 7/14 (2013.01); H02K 29/03 (2013.01);

(Continued)

(58) Field of Classification Search
CPC ...... H02K 21/14; H02K 1/146; H02K 1/2706; H02K 3/18; H02K 7/14; H02K 29/03; H02K 2201/03; H02K 2213/03; F04C 18/34; F04C 23/003; F04C 29/02; F04C 2210/26; F04C 2240/40
USPC ................................................. 310/156.11
See application file for complete search history.

(56) References Cited

U.S. PATENT DOCUMENTS

2005/0073211 A1 4/2005 Lee
2010/0194228 A1 8/2010 Lee et al.
(Continued)

FOREIGN PATENT DOCUMENTS

| JP | 2000-295805 | 10/2000 |
|---|---|---|
| JP | 2002-291179 | 10/2002 |

(Continued)

OTHER PUBLICATIONS

Extended European Search Report dated Feb. 23, 2017 in corresponding European Patent Application No. 16 19 2920.

*Primary Examiner* — Forrest M Phillips
(74) *Attorney, Agent, or Firm* — Staas & Halsey LLP

(57) ABSTRACT

An electric motor is provided. The electric motor includes a hollow-shaped stator configured to have a teeth part protruding on an inner surface thereof, and a rotor configured to be inserted into the hollow-shaped rotor, and including an outer surface facing the teeth part, and a plurality of poles therein. The rotor includes a bridge part disposed between poles and has a front rotor groove and a back rotor groove that are each dented at a front and a back of the bridge part with respect to a rotating direction of the rotor.

18 Claims, 15 Drawing Sheets

(51) Int. Cl.
*F04C 23/00* (2006.01)
*F04C 29/02* (2006.01)
*H02K 21/14* (2006.01)
*H02K 29/03* (2006.01)

(52) U.S. Cl.
CPC ...... *F04C 2210/26* (2013.01); *F04C 2240/40* (2013.01); *H02K 2201/03* (2013.01); *H02K 2213/03* (2013.01)

(56) References Cited

U.S. PATENT DOCUMENTS

| | | |
|---|---|---|
| 2011/0012465 A1 | 1/2011 | Kawamura et al. |
| 2011/0050022 A1 | 3/2011 | Li et al. |
| 2011/0062814 A1 | 3/2011 | Adaniya et al. |
| 2014/0028139 A1* | 1/2014 | Hamer .............. B29C 45/14467 310/156.11 |
| 2014/0077666 A1 | 3/2014 | Nishikawa et al. |
| 2015/0069874 A1* | 3/2015 | Iki ........................ H02K 1/2766 310/156.11 |
| 2016/0380492 A1* | 12/2016 | Kawasaki ............ H02K 1/2766 310/156.11 |

FOREIGN PATENT DOCUMENTS

| | | |
|---|---|---|
| JP | 2002-315243 | 10/2002 |
| JP | 2003-32985 | 1/2003 |
| JP | 2004-72845 | 3/2004 |
| JP | 2013-27150 | 2/2013 |
| JP | 2013-162557 | 8/2013 |
| KR | 10-2010-0090154 | 8/2010 |
| KR | 10-1076570 | 10/2011 |
| KR | 10-1133489 | 4/2012 |
| KR | 10-1478838 | 1/2015 |
| KR | 10-1522438 | 5/2015 |

* cited by examiner

ELECTRIC MOTOR AND COMPRESSOR HAVING THE SAME

CROSS-REFERENCE TO RELATED APPLICATIONS

This application claims the priority benefit of Korean Application No. 10-2015-0141366, filed Oct. 8, 2015, in the Korean Intellectual Property Office, the disclosure of which is incorporated herein by reference.

BACKGROUND

1. Field

Apparatuses and methods consistent with the present disclosure relate to an electric motor and a compressor having the same, and more particularly, to an electric motor capable of increasing efficiency while decreasing vibration noise of the electric motor by suggesting a shape of a stator and a rotor and a compressor having the same.

2. Description of the Related Art

Generally, a compressor is an apparatus that compresses a refrigerant evaporated in cooling apparatuses such as a refrigerator and an air conditioner. The compressor may include a reciprocating compressor and a rotary compressor. The reciprocating compressor compresses a vapor refrigerant by a reciprocation of a piston within a cylinder. The rotary compressor compresses the vapor refrigerant sucked by a rotation of an eccentric rotor along a predetermined eccentric path on an inner surface of the cylinder.

Further, the compressor uses an electric motor to generate the reciprocation of the piston or a rotational motion of the eccentric rotor. The electric motor may include a stator and a rotor. The stator is fixed to an external support to generate a magnetic field and the rotor rotates by the magnetic field that is generated by the stator. The stator is provided with a coil to generate the magnetic field. The coil may be formed by winding a winding wire around teeth of the stator made of a magnetic material.

SUMMARY

Additional aspects and/or advantages will be set forth in part in the description which follows and, in part, will be apparent from the description, or may be learned by practice of the invention.

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present disclosure provides an electric motor capable of increasing efficiency while decreasing vibration or operating noise.

The present disclosure minimizes a stress of cores of a stator and a rotor.

The present disclosure provides an electric motor used for a compressor that compresses a refrigerant evaporated in cooling apparatuses such as a refrigerator and an air conditioner.

According to an aspect of the present disclosure, an electric motor includes a hollow-shaped stator configured to have a teeth part protruding on an inner surface thereof, and a rotor configured to be inserted into the hollow, have an outer surface facing the teeth part, and have a plurality of poles provided therein, in which the rotor is provided with a bridge part disposed between poles and has a front rotor groove and a back rotor groove that are each dented at a front and a back of the bridge part with respect to a rotating direction of the rotor.

The rotor may have a rotating connection surface that is disposed between the front rotor groove and the back rotor groove to connect between the front and back rotor grooves.

The stator may have a front stator groove and a back stator groove that are each dented from bottoms each facing the front rotor groove and the back rotor groove.

The stator may have a fixed connection surface that is disposed between the front stator groove and the back stator groove to connect between the front and back stator grooves.

The teeth part may include a teeth body configured to protrude on an inner circumferential surface of the stator, and a teeth shoe configured to be connected to one end of the teeth body, protrude forward and backward with respect to the rotating direction of the rotor, and have an inner surface facing an outer surface of the rotor, in which a width W4 of the fixed connection surface has an interval equal to or larger than a width W3 of the teeth body.

The front stator groove may have a first front stator groove that is disposed at a front with respect to the rotating direction of the rotor and a second front stator groove that is disposed at a back of the first front stator groove and protrudes from the first front stator groove.

The back stator groove may have a first back stator groove that is disposed at a back with respect to the rotating direction of the rotor and a second back stator groove that is disposed at a front of the first back stator groove and protrudes from the first back stator groove.

An angle $\theta 2$ of a back end of the second front stator groove and a virtual line may be equal to or larger than an angle $\theta 1$ of a back end of the front rotor groove and the virtual line, based on the virtual line connecting between a center of the rotor and a center of the teeth part.

An angle $\theta 4$ of a front end of the first front stator groove and a virtual line may be smaller than an angle $\theta 5$ of a front end of the front rotor groove and the virtual line, based on the virtual line connecting between a center of the rotor and a center of the teeth part.

An angle $\theta 4$ of a front end of the first front stator groove and a virtual line may be larger than an angle $\theta 3$ of a front end of the second front stator groove and the virtual line, based on the virtual line connecting between a center of the rotor and a center of the teeth part and the angle $\theta 3$ may be larger than an angle $\theta 2$ of the back end of the second front stator groove and the virtual line.

The front and back stator grooves may have the same curvature radius as the front and back rotor grooves.

The front stator groove and the fixed connection surface and the back stator groove and the fixed connection surface may be formed at an obtuse angle.

A width W2 of the front rotor groove may have an interval larger than a width W1 of the front stator groove.

The front rotor groove and the back rotor groove may be symmetrical to each other with respect to the bridge part.

The stator may have a concave groove dented from the outer surface of the stator.

The teeth part may be provided in plural to have twelve slots formed between the teeth parts and the rotor has eight poles disposed therein.

According to another aspect of the present disclosure, an electric motor includes: a hollow-shaped stator configured to have a teeth part protruding on an inner surface thereof; and a rotor configured to be inserted into the hollow, have an outer facing the teeth part, and form an air gap spaced apart from the teeth part, in which the air gap includes: a first air gap part configured to be formed at a central portion; and second air gap parts configured to be each formed at an outside of the first air gap part and have an interval larger than the first air gap part.

The second air gap part may be formed between a front rotor groove and a back rotor groove and a bottom of the teeth part, in which the front rotor groove and the back rotor groove are each dented at a front and a back of a bridge part that is disposed between both ends of a pole provided therein with respect to a rotating direction of the rotor.

The first air gap part may be formed between a rotating connection surface and the bottom of the teeth part, in which the rotating connection surface is disposed between the front rotor groove and the back rotor groove and protrudes from the front and back rotor grooves.

A front end of the second air gap part disposed at one side with respect to the rotating direction of the rotor may be disposed ahead of a front end of the teeth part and a back end of the second air gap part disposed at the other side may be disposed behind a back end of the teeth part.

According to an aspect of the present disclosure, a compressor includes: a compressing part configured to compress a refrigerant; and an electric motor configured to provide a rotating force to the compressing part through a rotating shaft connected to the compressing part, wherein the electric motor includes: a hollow-shaped stator configured to have a teeth part protruding on an inner surface thereof; and a rotor configured to be inserted into the hollow, have an outer surface facing the teeth part, and have a plurality of poles provided therein, and the rotor is provided with a bridge part disposed between poles and has a front rotor groove and a back rotor groove that are each dented at a front and a back of the bridge part with respect to a rotating direction of the rotor.

BRIEF DESCRIPTION OF THE DRAWINGS

These and/or other aspects and advantages will become apparent and more readily appreciated from the following description of the embodiments, taken in conjunction with the accompanying drawings.

DETAILED DESCRIPTION

Figure 1:
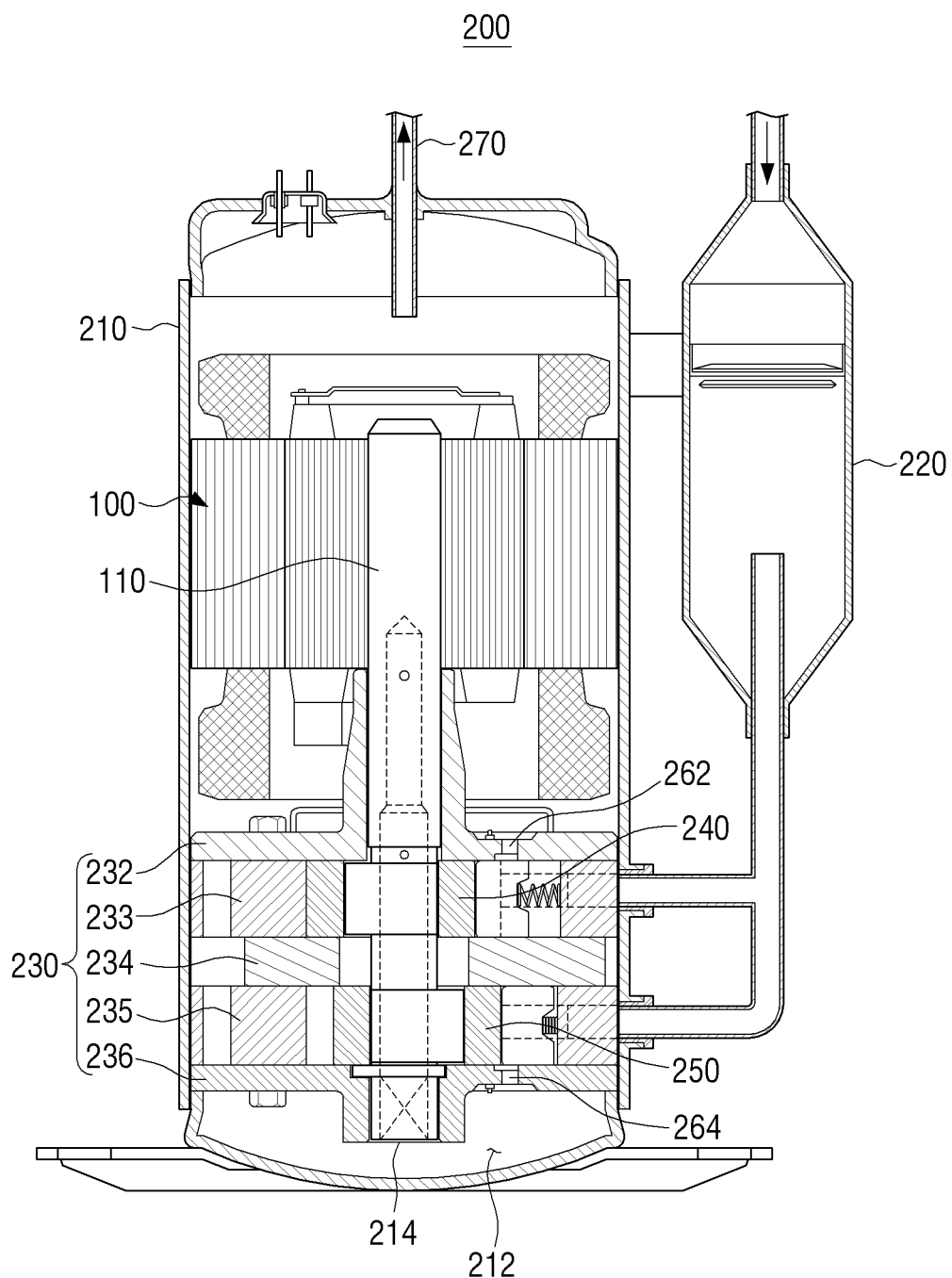
FIG. 1 is a diagram illustrating a compressor according to an exemplary embodiment of the present disclosure.

Reference will now be made in detail to the embodiments, examples of which are illustrated in the accompanying drawings, wherein like reference numerals refer to the like elements throughout. The embodiments are described below to explain the present invention by referring to the figures.

To help understand the present disclosure, exemplary embodiments of the present disclosure will be described in more detail with reference to FIGS. 1 to 15. The following exemplary embodiments will be described based on exemplary embodiments most appropriate to understand technical features of the present disclosure and the technical features of the present disclosure are not limited to the exemplary embodiments to be descried below but it is illustrated that the present disclosure may be implemented like exemplary embodiments to be described.

Therefore, the present disclosure may be variously changed within the technical scope of the present disclosure in accordance with the exemplary embodiments to be described below and the changed exemplary embodiments may be considered to be included in the technical scope of the present disclosure. Further, to help understand the following exemplary embodiments, in signs described in the accompanying drawing, relevant components among components performing the same operations in each exemplary embodiment are denoted by reference numerals on the same or extending line.

FIG. 1 is a diagram illustrating a compressor according to an exemplary embodiment of the present disclosure. As illustrated in FIG. 1, a compressor 200 may be provided to be close to an accumulator 220. The compressor 200 may include a casing 210, an electric motor 100 installed at an upper portion in the casing 210, and a compressing part 230 installed at a lower portion in the casing 210. The compressing part 230 may be connected to the electric motor 100 through a rotating shaft 110.

An inside of the casing 210 may be provided with a refrigerant receiving part 211 that receives a high-pressure vapor refrigerant compressed by the compressing part 230 and an oil receiving part 212 receiving compressor oil that smoothes a rotation of the electric motor 100 and decreases a temperature in the casing 210.

The compressing part 230 may be provided in the casing 210 and may include first and second cylinders 233 and 235 that have a compression space partitioned from each other. The compressing part 230 may include a plurality of bearing plates 232, 234, and 236 that form the compression space together by covering upper and lower portions of the first and second cylinders 233 and 235, respectively. The bearing plates 232, 234, and 236 may support the rotating shaft 110.

The first and second cylinders 233 and 235 may include first and second rolling pistons 240 and 250 rotating while having different centers in the compression space formed therein. The illustrated compressor 200 includes the first and second cylinders 233 and 235, but the present disclosure is not limited thereto. Therefore, the compressor 200 may include, for example, one cylinder or at least three cylinders.

A first outlet 262 and a second outlet 264 may be formed between the first bearing plate 232 and the third bearing plate 236 so that a vapor refrigerant compressed in a first compression space and a second compression space is discharged into the casing 210. When the compressor 200 is operated, the inside of the casing 210 is maintained at a high pressure by the compressed vapor refrigerant discharged through the outlets 262 and 264 and the compressed vapor refrigerant in the casing 210 may be discharged to the outside through a discharge pipe 270 that is provided at an upper portion of the casing 210.

The first rolling piston 240 and the second rolling piston 250 may be coupled with the rotating shaft 110 of the electric motor 100. For example, the first rolling piston 240 and the second rolling piston 250 may be coupled with the rotating shaft while having different centers. Thus, the first rolling piston 240 and the second rolling piston 250 in the compression space may eccentrically rotate to compress the vapor refrigerant.

The illustrated compressor 200 described above is a rotary compressor, but the compressor 200 is not limited thereto. Therefore the disclosure may be applied, for example, to a reciprocating compressor. Further, the electric motor 100 may be installed, for example, to rotate a drum that is included in a washing machine.

Figure 2:
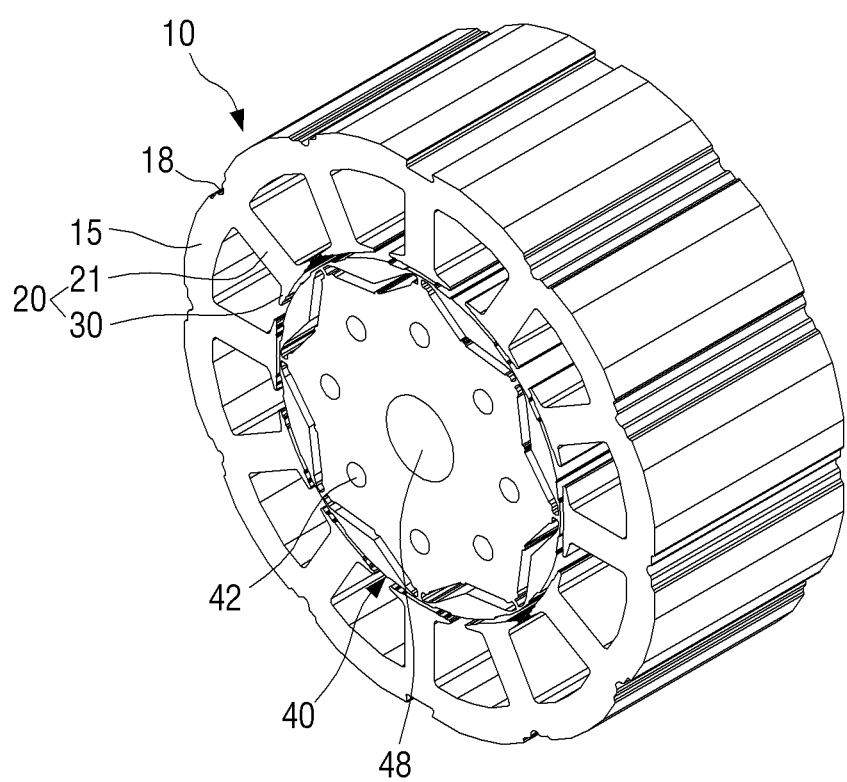
FIG. 2 is a diagram illustrating a first exemplary embodiment of an electric motor illustrated in FIG. 1.
Figure 3:
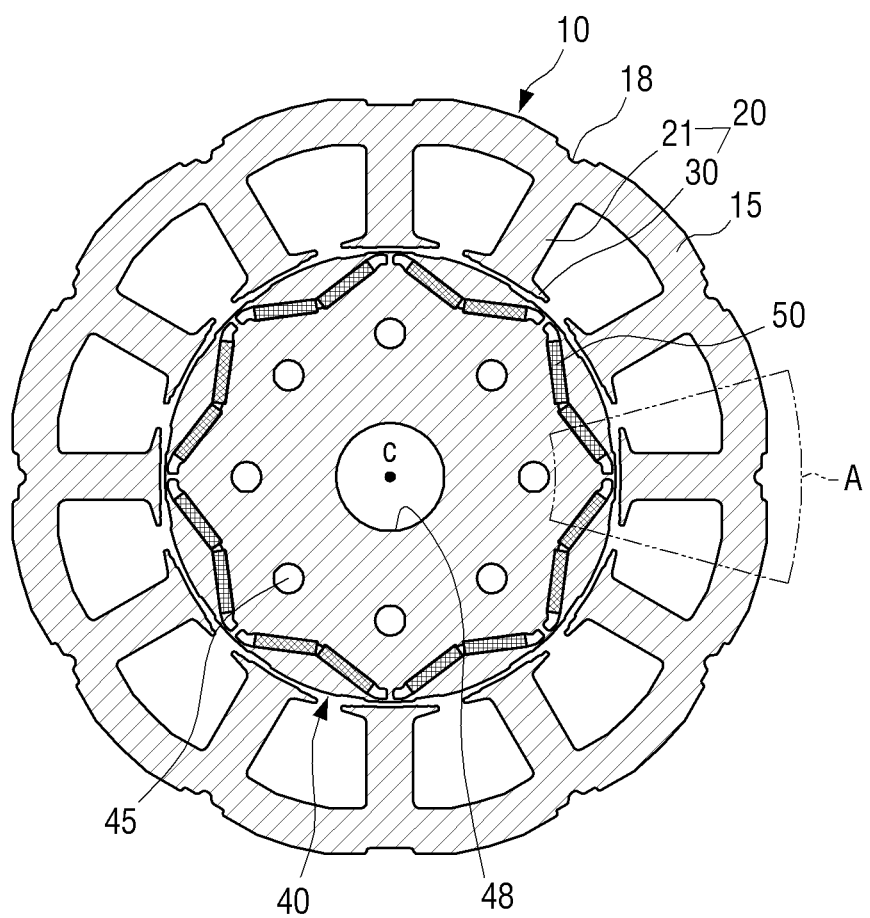
FIG. 3 is an exemplary cross-sectional view of the electric motor illustrated in FIG. 2.

FIG. 2 is a diagram illustrating a first exemplary embodiment of an electric motor illustrated in FIG. 1 and FIG. 3 is an exemplary cross-sectional view of the electric motor illustrated in FIG. 2. As illustrated in FIGS. 2 and 3, the electric motor 100 includes a stator 10 and a rotor 40.

The stator 10 may be formed by stacking a plurality of magnetic steel plates in an approximately cylindrical shape. The stator 10 may have a hollow shape that includes a plurality of teeth parts 20 protruding on an inner surface thereof and a yoke part 15 connecting between the respective teeth parts 20. Slots are formed between the respective teeth parts 20 and a coil (not illustrated) connected to an external power supply through the slots is wound around the teeth part 20. For example, the coil wound around the stator 10 may be formed in a concentrated winding type.

The teeth part 20 may be disposed along an inner circumferential surface of the stator 10 at equal intervals and, for example, twelve teeth parts 20 may be formed. However, the number of teeth parts is not limited thereto, and, for example, three, six, or nine teeth parts 20, or the like may be formed.

The teeth part 20 may have a teeth body 21 protruding on the inner circumferential surface of the stator 10 and a teeth shoe 30 connected to a distal end of the teeth body 21. The teeth shoe 30 protrudes toward both sides of a circumferential direction, respectively, and thus may have an inner surface that faces an outer surface of the rotor 40. That is, the inner surface of the teeth shoe 30 may have a width larger than that of the teeth body 21.

An outside of the stator 10 may be provided with a concave groove 18. Oil, for example, may easily return through the concave groove 18 and a channel through which a refrigerant is smoothly circulated may be provided. Further, upon being thermally press-fitted in an airtight container, a deformation at an air gap due to a thermal press-fitting force may be minimized.

The rotor 40 may be inserted into a hollow of the stator 10 and has the outer surface that faces the teeth part 20. The rotor 40 may be provided with a rotating shaft insertion hole 48 and the rotating shaft 110 (see, for example, FIG. 1) may be press-fitted in the rotating shaft insertion hole 48 to be fixed. The rotor 40 may have a cylindrical shape and rotate with respect to the rotating shaft 110 (see, for example, FIG. 1).

The inside of the rotor 40 may be provided with installation grooves (not illustrated) so that permanent magnets 50 may be inserted thereinto. For example, a disposition structure of the permanent magnets 50 forming one magnetic pole may have a "V"-letter shape in which the permanent magnets 50 form an acute angle to each other in one pole.

The permanent magnets 50 may be buried in an outside of the rotating shaft insertion hole 48 while being symmetrical to each other so that two magnetic centers are orthogonal to each other. The permanent magnet 50 may be a rare-earth-based magnet. The permanent magnet 50 may include eight poles provided therein to correspond to twelve slots and the number of poles may be changed according to the number of slots.

Further, the rotor 40 may be provided with coupling holes 45 formed at an outside of the rotating shaft insertion hole 48 and may be configured to be fastened by a rivet through the coupling holes 45.

That is, if a current is applied to the coils wound around the slots of the stator 10, a rotating magnetic field may be generated from the teeth parts 20 provided between the slots while polarities of the respective coils are sequentially changed. The rotor 40 facing the teeth part 20 may be formed with a magnetic field by the permanent magnet 50. A rotating force may be applied to the rotor 40 by a repulsive force generated when the polarity of the rotating magnetic field generated from the teeth part 20 is the same as that of the permanent magnet 50 and an attractive force generated when the polarity of the rotating magnetic field generated from the teeth part 20 is different from that of the permanent magnet 50. That is, the rotor 40 rotates with respect to the rotating shaft 110 (see, for example, FIG. 1).

Figure 4:
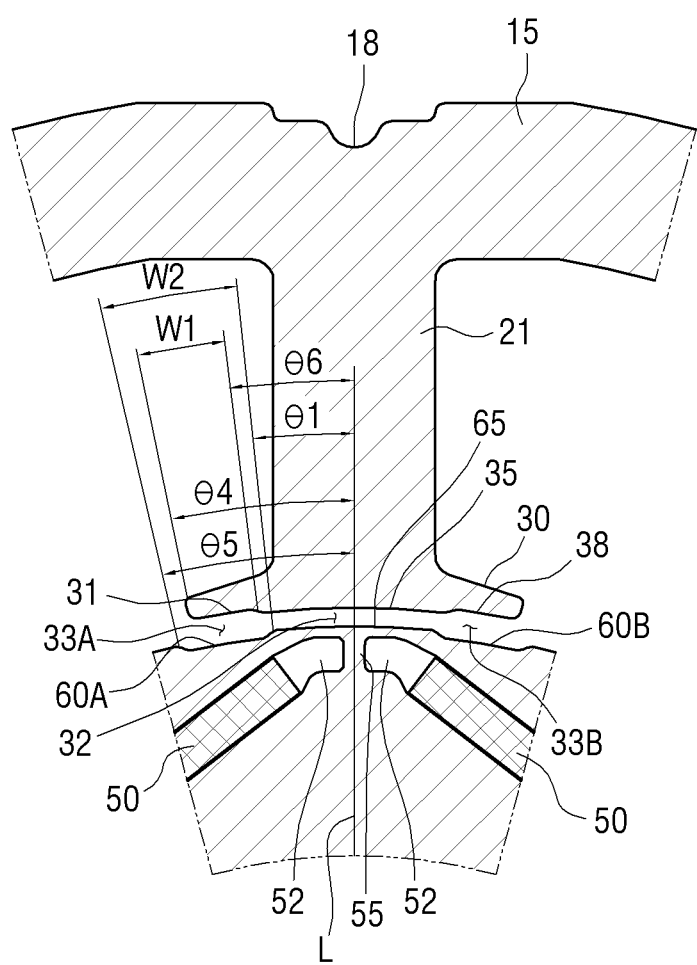
FIG. 4 is an exemplary enlarged view of the section A illustrated in FIG. 3.
Figure 5:
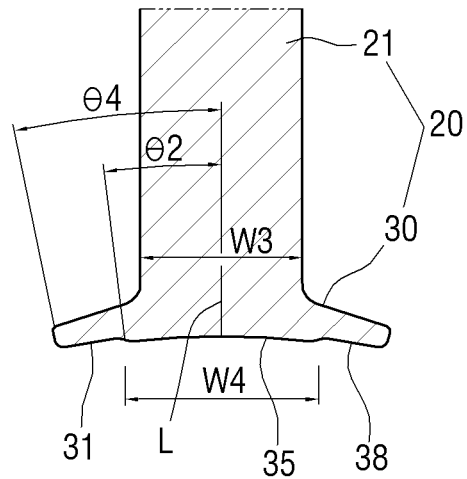
FIG. 5 is an exemplary enlarged view of a stator illustrated in FIG. 4.

FIG. 4 is an exemplary enlarged view of A illustrated in FIG. 3 and FIG. 5 is an exemplary enlarged view of a stator illustrated in FIG. 4. As illustrated in FIGS. 4 and 5, the permanent magnet 50 may be inserted so that adjacent magnetic poles have an opposing polarity to each other. Both ends of the permanent magnet 50 at which opposing polarities face each other may be provided with barrier holes 52 to prevent a short and a leakage of magnetic flux. A bridge part 55 may be formed between the barrier holes 52.

The rotor 40 has a front rotor groove 60A and a back rotor groove 60B that are each dented at a front and a back of the bridge part 55 with respect to the rotating direction of the rotor 40. The rotor 40 has a rotating connection surface 65 disposed between the front rotor groove 60A and the back rotor groove 60B, in which the rotating connection surface 65 connects between a front rotor groove 60A and a back rotor groove 60B. The front rotor groove 60A and the rotating connection surface 65 and the rotating connection surface 65 and the back rotor groove 60B may each be formed at an obtuse angle.

The stator 10 has a front stator groove 31 and a back stator groove 38 that are each dented from inner surfaces each facing the front rotor groove 60A and the back rotor groove 60B. The stator 10 has a fixed connection surface 35 disposed between the front stator groove 31 and the back stator groove 38, in which the fixed connection surface 35 connects between the front stator groove 31 and the back stator groove 38. The front stator groove 31 and the fixed connection surface 35 and the fixed connection surface 35 and the back stator groove 38 may each be formed at an obtuse angle.

A width W4 of the fixed connection surface 35 may have an interval equal to or larger than the width W3 of the teeth body 21. In an electric motor 100 having eight poles and twelve slots according to the exemplary embodiment of the present disclosure, W4≥W3 may be preferable in the efficiency of the electric motor 100 and the width W4 of the fixed connection surface 35 may be smaller than that of the teeth body 21 according to the number of slots. For example, in the electric motor having six slots, the width of the fixed connection surface 35 may be smaller than that of the teeth body 21.

A width W2 of the front rotor groove 60A may have an interval larger than a width W1 of the front stator groove 31.

The front and back stator grooves 31 and 38 may have a curvature radius equal to that of the front and back rotor grooves 60A and 60B.

An angle θ5-θ1 between a front end of the front rotor groove 60A and a back end of the front rotor groove 60A is larger (θ5-θ1>θ4-θ6) than an angle θ4-θ6 between a front end of the front stator groove 31 and a back end of the front stator groove 31, based on a virtual line L that connects between a center C of the rotor and a center of the teeth part 20. That is, the front stator groove 31 has a smaller separation distance than the front rotor groove 60A and is received in the front rotor groove 60A. The front rotor groove 60A and the back rotor groove 60B may be symmetrical to each other with respect to the bridge part 55.

An angle θ4 of the front end of the front stator groove 31 and the virtual line L is larger than an angle θ2 of the front end of the fixed connection surface 35 and the virtual line L, based on the virtual line L that connects between the center of the rotor 40 and the center of the teeth part 20. The front stator groove 31 and the back stator groove 38 may be symmetrical to each other with respect to a center of the fixed connection surface 35.

That is, an air gap may be formed between the rotor 40 and the stator 10. The air gap may have a first air gap part 32 formed between the rotating connection surface 65 and the fixed connection surface 35 opposing thereto and second air gap parts 33A and 33B that are each formed at an outside of the first air gap part 32, e.g., at a central portion of the air gap. The second air gap parts 33A and 33B may be formed to have a larger interval than the first air gap part 32 by the front stator groove 31 and the front rotor groove 60A and the back stator groove 38 and the back rotor groove 60B.

Figure 6:
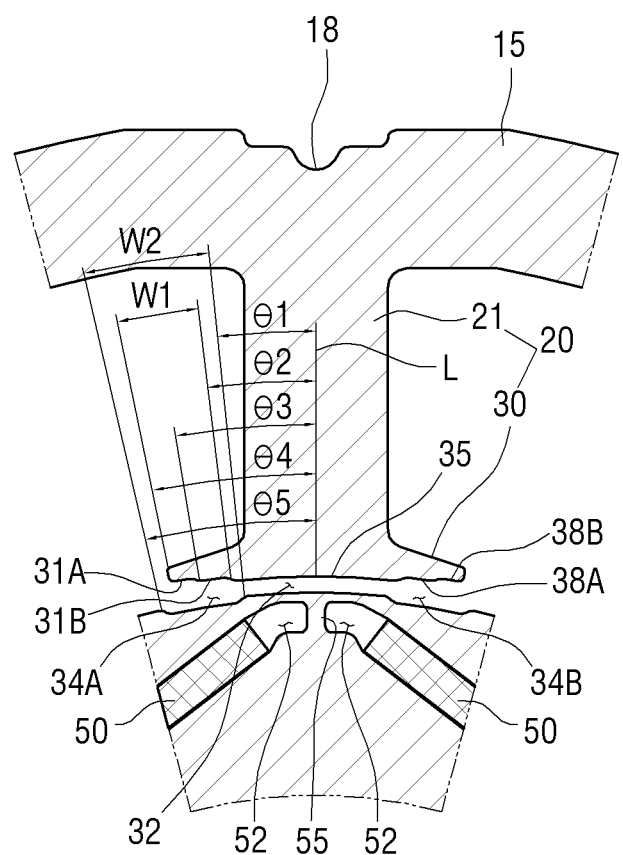
FIG. 6 is a cross-sectional view of a second exemplary embodiment of the electric motor illustrated in FIG. 1.
Figure 7:
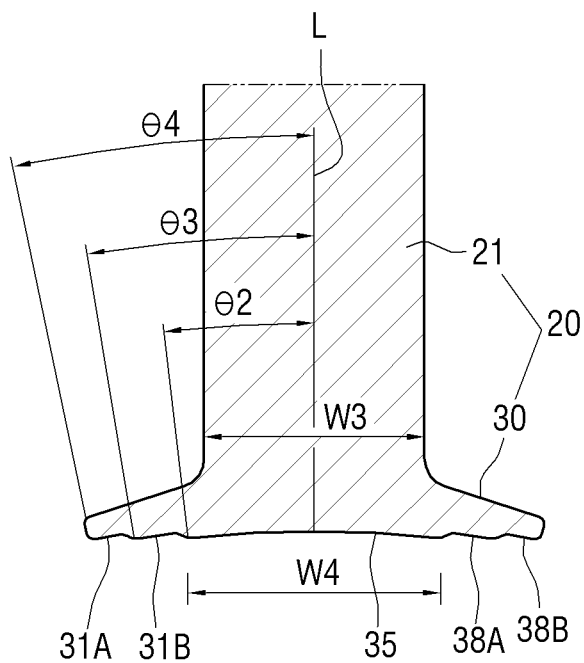
FIG. 7 is an enlarged view of the stator illustrated in FIG. 6.

FIG. 6 is an exemplary cross-sectional view of a second exemplary embodiment of the electric motor illustrated in FIG. 1 and FIG. 7 is an enlarged view of the stator illustrated in FIG. 6. In FIGS. 6 and 7, a difference from the foregoing electric motor is described but the omitted description may be replaced by the foregoing content. As illustrated in FIGS. 6 and 7, the rotor 40 has the bridge part 55 disposed between poles. A front and a back of the bridge part 55 with respect to the rotating direction of the rotor 40 are provided with the front rotor groove 60A and the back rotor groove 60B that are each dented.

The stator 10 has the front stator groove 31 and the back stator groove 38 that are each dented from the inner surfaces each facing the front rotor groove 60A and the back rotor groove 60B. The front stator groove 31 may have first and second front stator grooves 31A and 31B. The first front stator groove 31A may be disposed at the front with respect to the rotating direction of the rotor 40. A second front stator groove 31B may be disposed at the back of the first front stator groove 31A and protrudes from the first front stator groove 31A.

The back stator groove 38 may have first and second back stator grooves 38B and 38A. The first back stator groove 38B is disposed at the back with respect to the rotating direction of the rotor 40. A second back stator groove 38A is disposed at the front of the first back stator groove 38B and protrudes from the first back stator groove 38B. That is, the first front stator groove 31A and the first back stator groove 38B and the second front stator groove 31B and the second back stator groove 38A may each be symmetrical to each other with respect to the virtual line L connecting between the center of the rotor 40 and the center of the teeth part 20.

An angle θ2 of a back end of the second front stator groove 31B and the virtual line L may be equal to or larger than an angle θ1 of a back end of the front rotor groove 60A and the virtual line L, based on the virtual line L connecting between the center of the rotor 40 and the center of the teeth part 20. An angle θ5 of a front end of the first front stator groove 31A and the virtual line L is larger than an angle θ4 of the front end of the front rotor groove 60A and the virtual line L.

The angle θ4 of the front end of the first front rotor groove 60A and the virtual line L is larger than an angle θ3 of the front end of the second front stator groove 31B and the virtual line L, in which the angle θ3 is larger than the angle θ2 of the back end of the second front stator groove 31B and the virtual line L. That is, θ1≤θ2<θ3<θ4<θ5.

Figure 8:
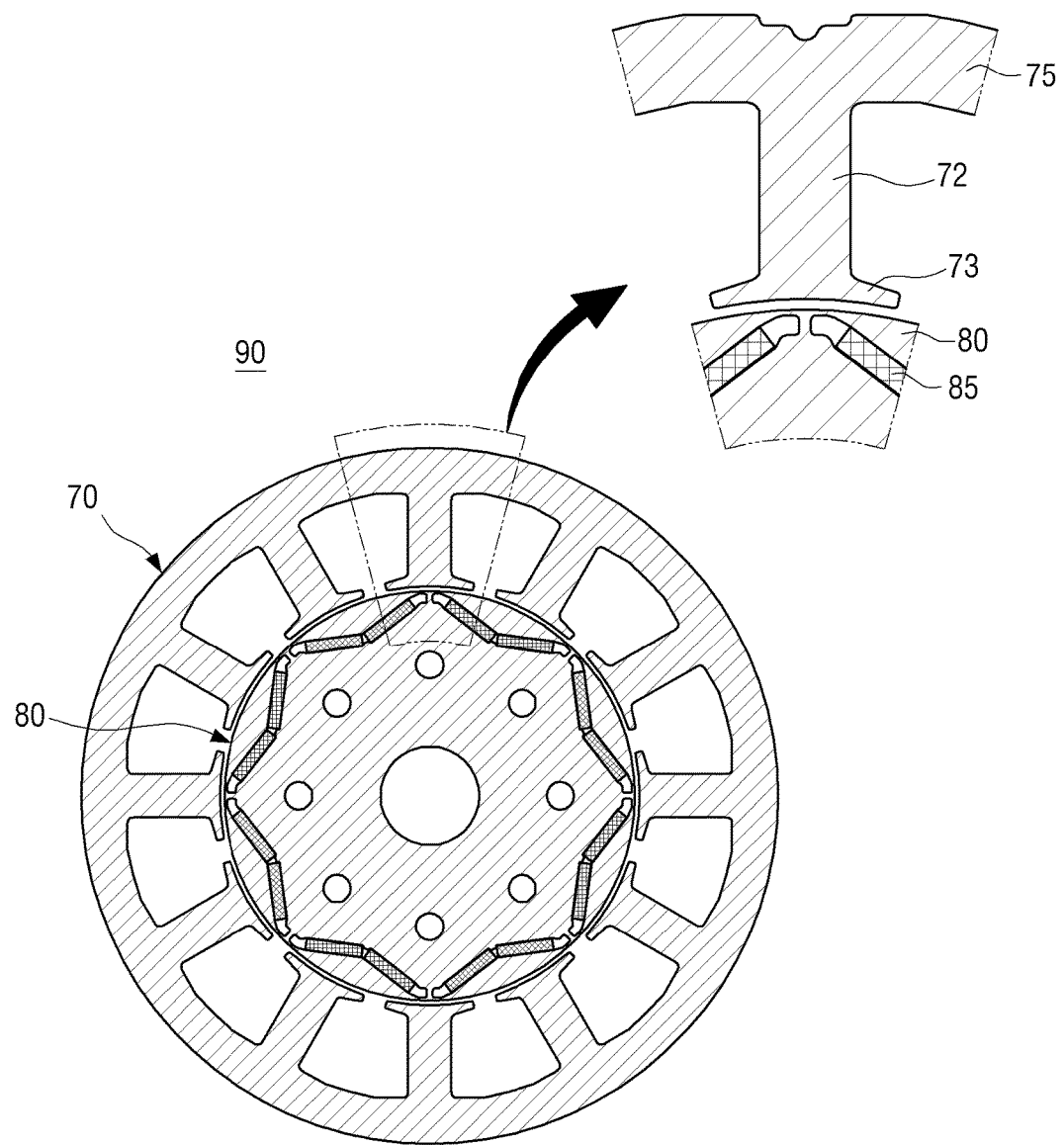
FIG. 8 is a diagram illustrating the existing electric motor.

FIG. 8 is a diagram illustrating the existing electric motor. Generally, a brushless direct current motor does not include a brush and a commutator but includes an electronic commutation mechanism, such that mechanical or electrical noise may not be caused, a motor having various speeds from low speed to high speed may be manufactured, a rotating torque may be stable due to a multi pole, and a long-life electric motor may be simply manufactured.

The stator of the existing brushless direct current motor is configured to include a plurality of teeth protruding on an inner circumferential surface thereof, concave slots formed between the respective teeth, a stator core having a slot opening formed between the respective tips protruding at both ends of the teeth, and coils wound around both slots of the teeth of the stator core.

Air gaps between a stator 70 and a rotor 80 have the same interval. In this case, a deviation in magnetic density is large by a magnetic force with a permanent magnet of the rotor 80, and therefore a cogging torque by which the rotor does not generate a uniform torque is caused, such that the motor may vibrate and thus vibration noise may be caused.

In particular, the air gap that is the interval between the rotor and the stator is preferably designed to be small. In this case, a change in reluctance is large and thus the cogging torque is increased and a torque ripple is also large, which has an adverse effect on the vibration noise.

Figure 9:
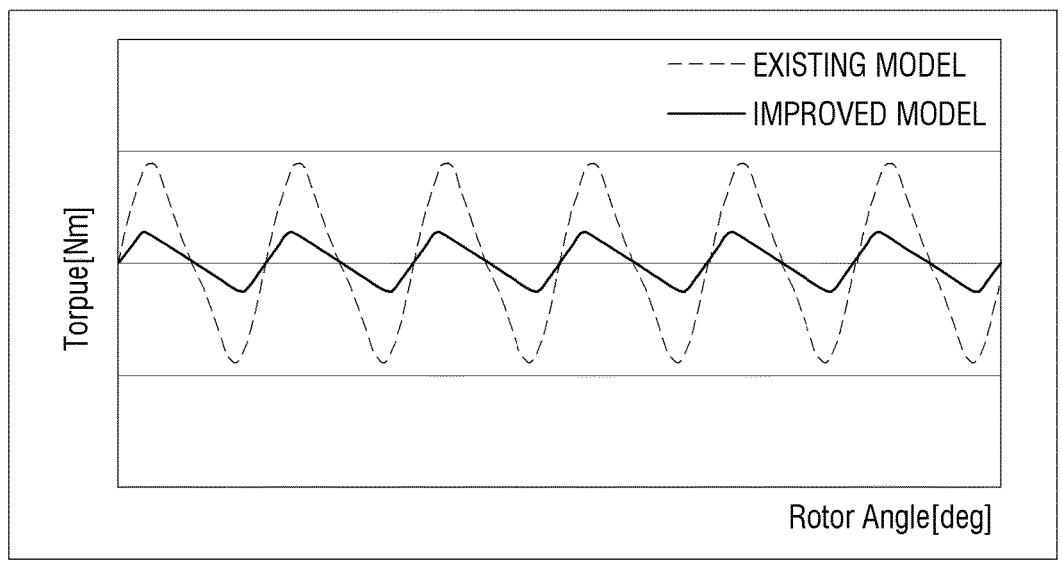
FIGS. 9 to 15 are exemplary comparison diagrams of exemplary improvement effects of the present disclosure and the related art.
Figure 10:
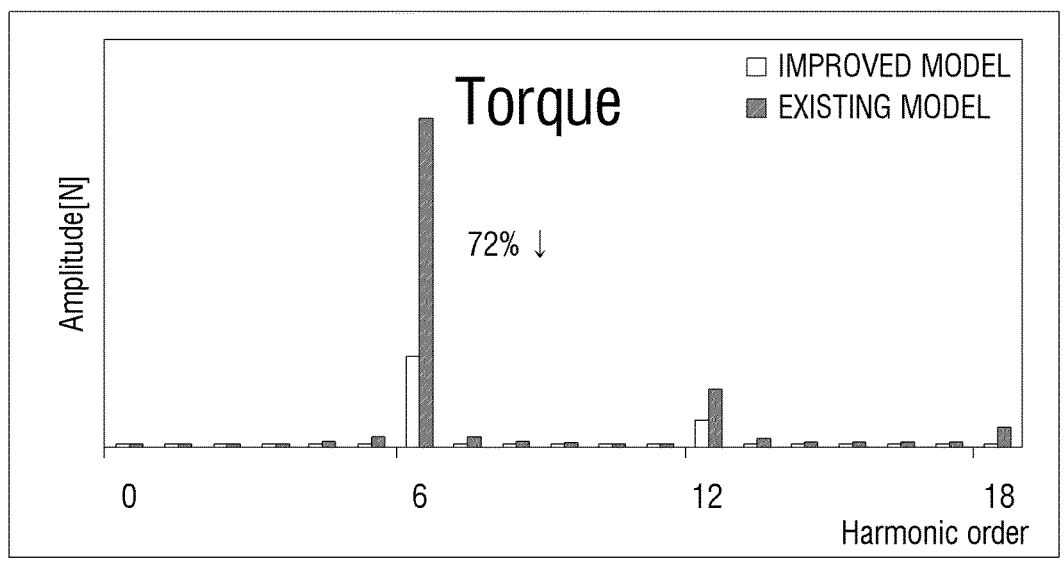

FIGS. 9 to 15 are exemplary comparison diagrams of exemplary improvement effects of the present disclosure and the related art. FIGS. 9 and 10 are diagrams illustrating a cogging torque frequency. As illustrated in FIGS. 9 and 10, as an analysis result of the cogging torque frequency of the electric motor based on a finite difference method (FEM) analysis, it may be confirmed that a sixth order component is decreased by about 72%.

Figure 11:
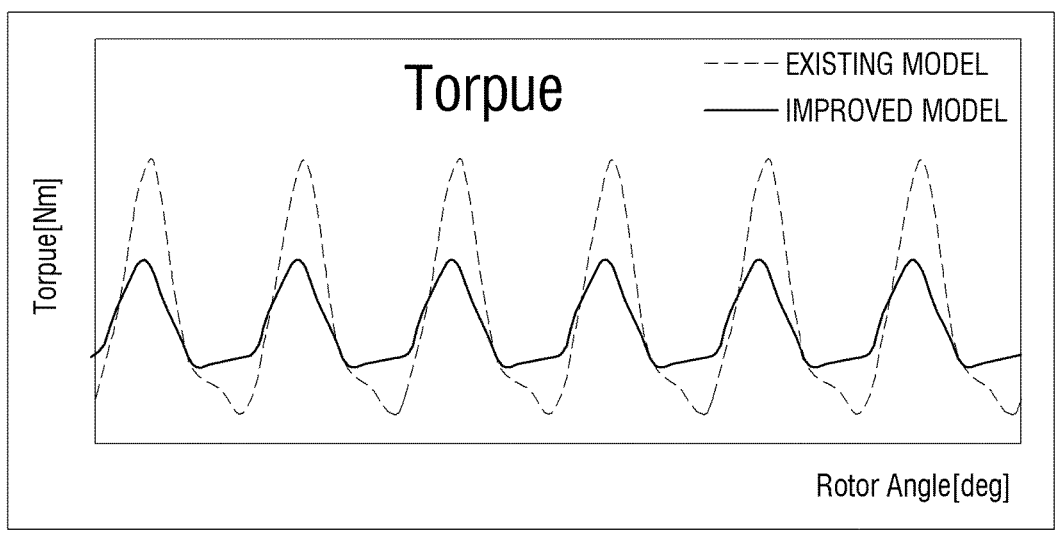
Figure 12:
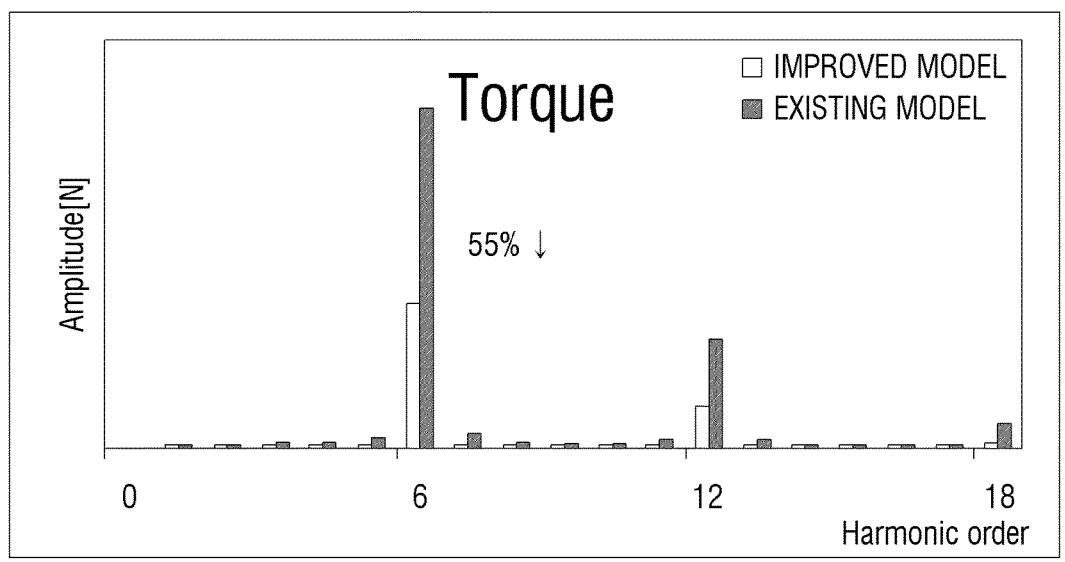

FIGS. 11 and 12 are diagrams illustrating a torque ripple frequency. As illustrated in FIGS. 11 and 12, it may be confirmed that the sixth order component may be decreased by about 55%.

Figure 13:
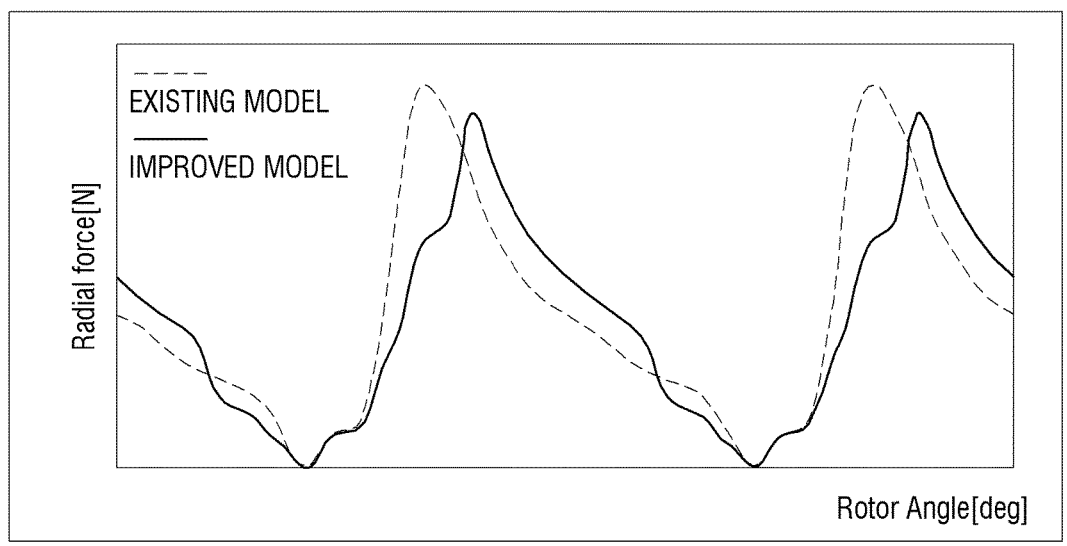
Figure 14:
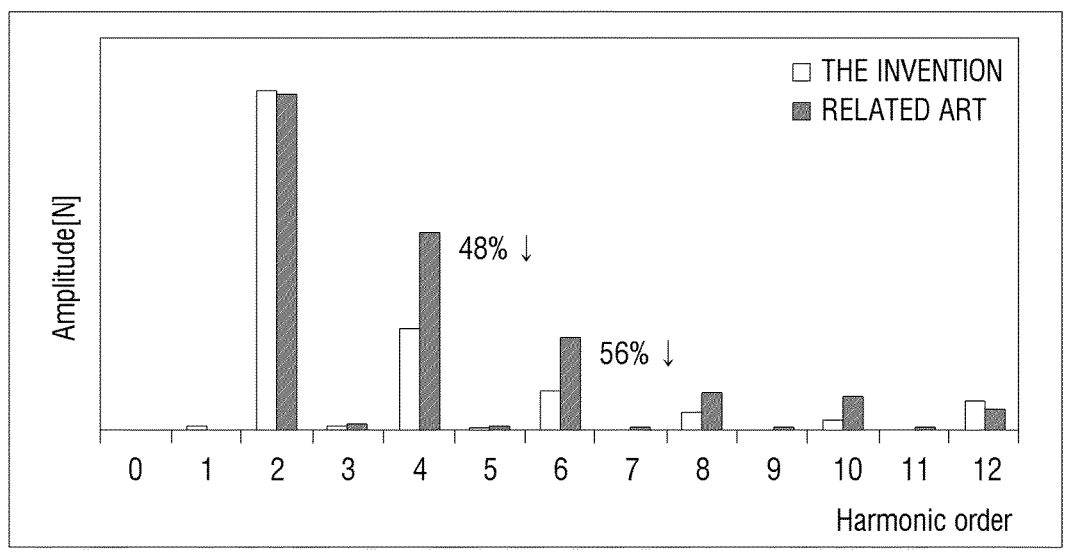

FIGS. 13 and 14 are diagrams illustrating stress frequencies of the cores of the stator and the rotor. As illustrated in FIGS. 13 and 14, comparing with the existing model, it may be confirmed that a fourth order component may be decreased by about 48% and the sixth order component is decreased by about 56%.

Figure 15:
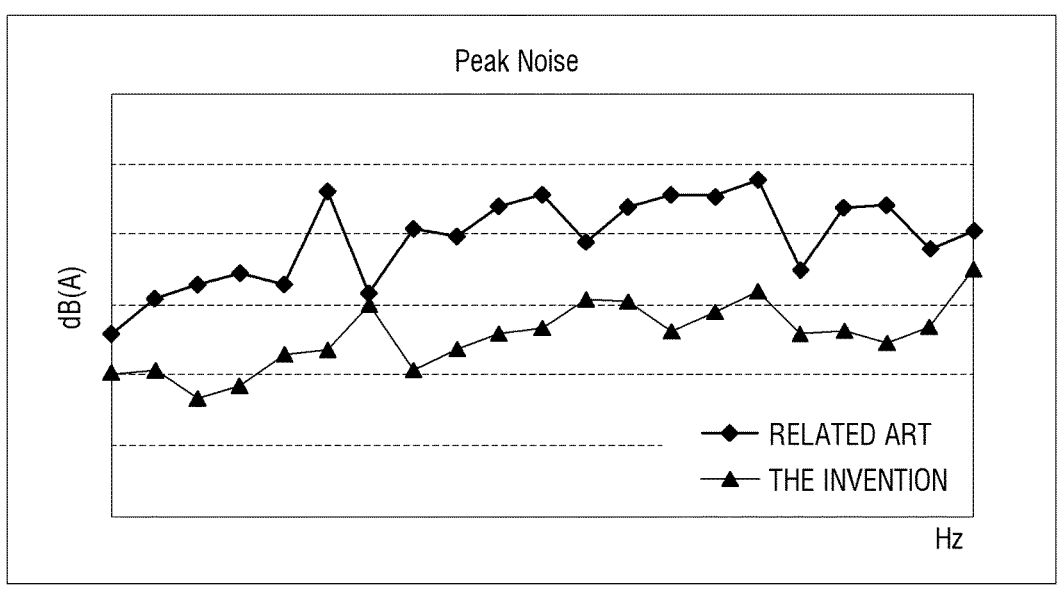

FIG. 15 is a comparison diagram of vibration noise of a compressor adopting an exemplary the electric motor of the present disclosure. As illustrated in FIG. 15, it may be confirmed that a harmonic component is decreased, and thus efficiency is increased and the vibration noise may be minimized.

That is, an exemplary embodiment of the present disclosure may adjust the air gap between the stator 10 and the rotor 40 to decrease the cogging torque, the torque ripple, and the stress frequency, thereby increasing the efficiency of the electric motor. Further, the vibration caused upon the driving of the rotor 40 may be minimized and the noise involved by the vibration may be decreased, thereby improving the reliability of the product.

In connection with the foregoing electric motor 100, an inner-rotor type motor in which the rotor 40 is disposed at the inside of the stator 10 is described as an example, but the invention is not limited to the same, and an outer-rotor type motor in which the rotor 40 is disposed at the outside of the stator 10 may be used.

Hereinabove, various exemplary embodiments of the present disclosure are individually described, but each exemplary embodiment need not necessarily be implemented alone and therefore the configurations and operations of each exemplary embodiment may also be implemented in combination with at least one other exemplary embodiment.

Although the preferred exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, such modifications, additions and substitutions should also be understood to fall within the scope of the present disclosure.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An electric motor, comprising:
a hollow-shaped stator configured to have a teeth part protruding on an inner surface thereof; and
a rotor configured to be inserted into the hollow-shaped stator and include an outer surface facing the teeth part of the hollow-shaped stator, and a plurality of poles therein,
wherein the rotor includes a bridge part disposed between poles, and a front rotor groove and a back rotor groove, and
wherein the stator includes a front stator groove and a back stator groove facing the front rotor groove and the back rotor groove, respectively, so as to form a non-uniform gap.

2. The electric motor according to claim 1, wherein the rotor includes a rotating connection surface disposed between the front rotor groove and the back rotor groove to connect between the front and back rotor grooves.

3. The electric motor according to claim 1, wherein the stator includes a fixed connection surface disposed between the front stator groove and the back stator groove to connect between the front and back stator grooves.

4. The electric motor according to claim 3, wherein the teeth part includes:
a teeth body configured to protrude on an inner circumferential surface of the stator, and
a teeth shoe configured to be connected to one end of the teeth body, protrude forward and backward with respect to the rotating direction of the rotor, and have an inner surface facing the outer surface of the rotor, and
a width W4 of the fixed connection surface has an interval equal to or larger than a width W3 of the teeth body.

5. The electric motor according to claim 1, wherein the front stator groove has a first front stator groove disposed at a front with respect to the rotating direction of the rotor and a second front stator groove disposed at a back of the first front stator groove and protrudes from the first front stator groove, and
the back stator groove has a first back stator groove disposed at a back with respect to the rotating direction of the rotor and a second back stator groove disposed at a front of the first back stator groove and protrudes from the first back stator groove.

6. The electric motor according to claim 5, wherein an angle θ2 of a back end of the second front stator groove and a virtual line is equal to or larger than an angle θ1 of a back end of the front rotor groove and the virtual line, based on the virtual line connecting between a center of the rotor and a center of the teeth part.

7. The electric motor according to claim 5, wherein an angle θ4 of a front end of the first front stator groove and a virtual line is smaller than an angle θ5 of a front end of the front rotor groove and the virtual line, based on the virtual line connecting between a center of the rotor and a center of the teeth part.

8. The electric motor according to claim 5, wherein an angle θ4 of a front end of the first front stator groove and a virtual line is larger than an angle θ3 of a front end of the second front stator groove and the virtual line, based on the virtual line connecting between a center of the rotor and a center of the teeth part, and
the angle θ3 is larger than an angle θ2 of a back end of the second front stator groove and the virtual line.

9. The electric motor according to claim 1, wherein the front and back stator grooves have the same curvature radius as the front and back rotor grooves.

10. The electric motor according to claim 3, wherein the front stator groove and the fixed connection surface and the back stator groove and the fixed connection surface are formed at an obtuse angle.

11. The electric motor according to claim 1, wherein a width W2 of the front rotor groove has an interval larger than a width W1 of the front stator groove.

12. The electric motor according to claim 1, wherein the front rotor groove and the back rotor groove are symmetrical to each other with respect to the bridge part.

13. The electric motor according to claim 1, wherein the teeth part is a plurality of teeth parts and including twelve-slots formed between the teeth parts and the rotor has eight poles disposed therein.

14. An electric motor, comprising:
a hollow-shaped stator configured to have a teeth part protruding on an inner surface thereof; and
a rotor configured to be inserted into the hollow-shaped stator and including an outer surface facing the teeth part, and to form an air gap spaced apart from the teeth part of the hollow-shaped stator,
wherein the air gap includes:
a first air gap part configured to be formed at a central portion of the air gap, and
a second air gap part configured to be at an outside of the first air gap part and to have an interval larger than the first air gap part, the second air gap part being formed between a stator groove on the teeth part, so as to form a non-uniform gap.

15. The electric motor according to claim 14, wherein the second air gap part is formed between a front rotor groove and a back rotor groove and the stator groove on a bottom of the teeth part, the front rotor groove and the back rotor groove being each dented at a front and a back of a bridge part disposed between both ends of a pole therein with respect to a rotating direction of the rotor.

16. The electric motor according to claim 15, wherein the first air gap part is formed between a rotating connection surface and the bottom of the teeth part, the rotating connection surface being disposed between the front rotor groove and the back rotor groove and protruding from the front and back rotor grooves.

17. The electric motor according to claim 14, wherein a front end of the second air gap part disposed at one side with respect to the rotating direction of the rotor is disposed ahead of a front end of the teeth part and a back end of the second air gap part disposed at the other side is disposed behind a back end of the teeth part.

18. A compressor, comprising:
a compressing part configured to compress a refrigerant; and
an electric motor configured to provide a rotating force to the compressing part through a rotating shaft connected to the compressing part,
wherein the electric motor includes:
a hollow-shaped stator configured to have a teeth part protruding on an inner surface thereof, and
a rotor configured to be inserted into the hollow-shaped stator and including an outer surface facing the teeth part of the hollow-shaped stator, and a plurality of poles therein, and
the rotor includes a bridge part disposed between poles and a front rotor groove and a back rotor groove, and
wherein the stator includes a front stator groove and a back stator groove facing the front rotor groove and the back rotor groove respectively, so as to form a non-uniform gap.

* * * * *